April 24, 1934.　　　　　E. M. BUSH　　　　　1,955,942
UNIVERSAL PULLEY BLOCK
Filed May 15, 1933
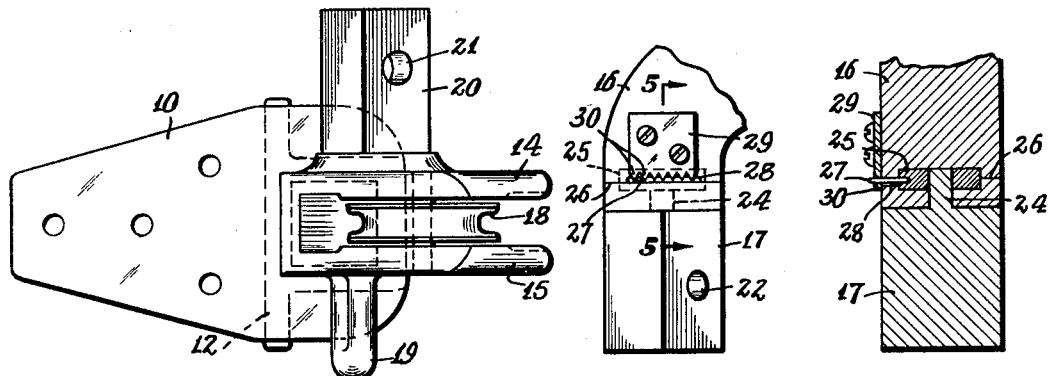
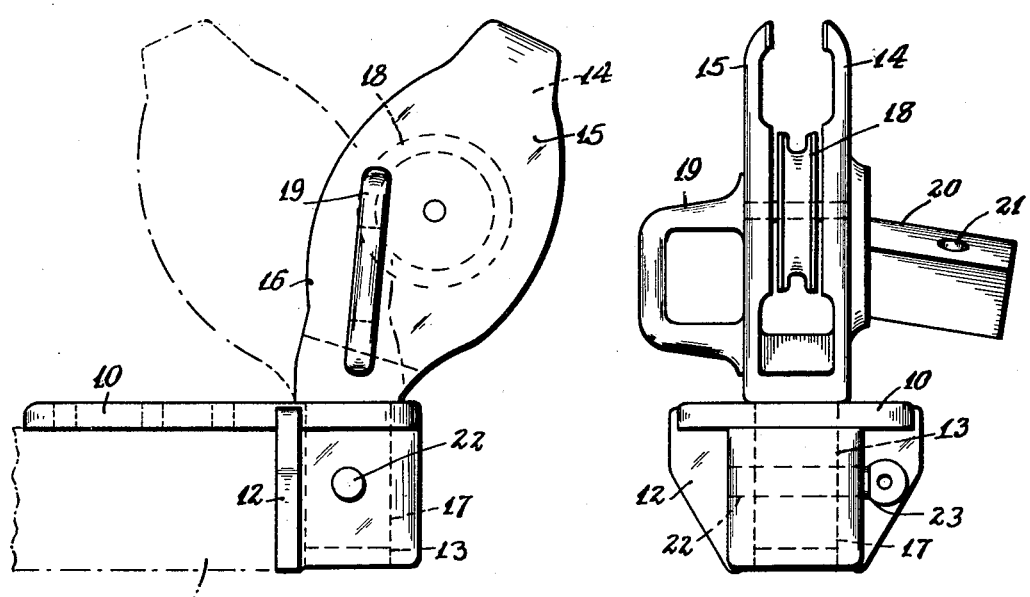
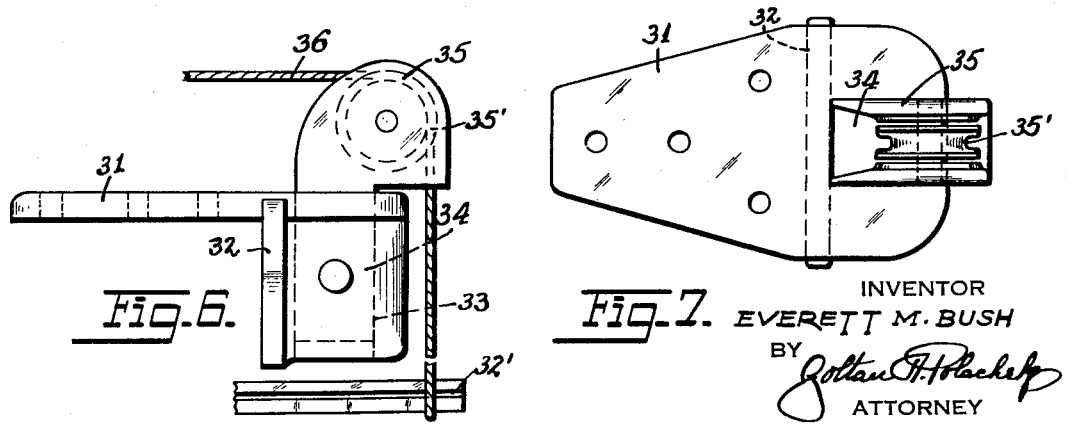
INVENTOR
EVERETT M. BUSH
BY
ATTORNEY Patented Apr. 24, 1934

1,955,942

UNITED STATES PATENT OFFICE 1,955,942

UNIVERSAL PULLEY BLOCK

Everett M. Bush, South Nyack, N. Y.

Application May 15, 1933, Serial No. 671,096

3 Claims. (Cl. 254—190)

This invention relates to new and useful improvements in a universal pulley block.

The invention has for an object the construction of an article as mentioned which is characterized by a bracket adapted to be attached upon the rear of a truck and a body portion adapted to be mounted in various positions upon the bracket and holding a roller for the pulley block so that the stumps of trees and other objects may be pulled from various positions relative to the position of the truck.

Still further the invention contemplates a novel arrangement of providing the body with a stem composed of several straight sides of equal lengths adapted to engage into a similar opening within the bracket so that the body may be turned in various positions depending upon the number of sides.

Still further the invention contemplates the arranging of the body at an inclination relative to the stem so that the pulley block assumes various inclined positions in the various positions that it may be placed in.

Furthermore the invention contemplates the provision of a second stem arranged upon the side of the body so that the pulley block may be mounted upon the opening in the bracket at various positions on its side.

Furthermore as another object of this invention it is proposed to provide an arrangement whereby the supporting stem of the body is separate and rotatively mounted on the body and an arrangement whereby the stem may be adjusted to various positions within the angular distance between adjacent sides of said stem. For example, if the stem has four sides then the arrangement allows the stem to be adjusted in various positions within 90 degrees.

Still further the invention contemplates a novel arrangement whereby the pulley block may be used to support various objects beneath the body of the truck.

Furthermore as another object of this invention it is proposed to construct a universal pulley block as mentioned which is simple and durable and which may be manufactured and sold at a reasonable cost.

For further comprehension of the invention, and of the objects and advantages thereof, reference will be had to the following description and accompaying drawing, and to the appended claims in which the various novel features of the invention are more particularly set forth.

In the accompanying drawing forming a material part of this disclosure:—

Fig. 1 is a plan view of an article constructed according to this invention.

Fig. 2 is a side elevational view of Fig. 1.

Fig. 3 is a rear elevational view of Fig. 2.

Fig. 4 is a view similar to a portion of Fig. 2 but illustrating a modified arrangement.

Fig. 5 is a fragmentary sectional view taken on the line 5—5 of Fig. 4.

Fig. 6 is a view similar to Fig. 2 but illustrating a modified arrangement.

Fig. 7 is a plan view of Fig. 6.

The universal pulley block according to this invention comprises a bracket 10 adapted to be attached upon the rear of a truck body indicated by the dot and dash lines 11. Said body 10 is composed of a horizontal portion for engagement upon the top of the truck body 11 and a vertical portion 12 for engagement upon the rear edge of the body 11. This bracket may be attached upon the truck with the provision of screws or rivets or the like. The bracket 10 is also provided with a vertical opening 13 having a plurality of straight sides of equal length. A body member of substantially fork shape and having a pair of arms 14, 15 connected at the bottom 16 is provided with a stem 17 at the bottom adapted to engage into the opening 13. This stem has sides of equal length and the same number as said opening 13 and adapted to snugly engage within the opening. The arms 14, 15 of the body member are disposed at an inclination upwards from the horizontal.

A roller 18 is rotatively mounted between the arms 14 and 15. This roller is adapted to receive a cable, cord or rope which may be attached upon the stump of trees or other objects to be lifted or drawn. A handle 19 is attached upon one side of the body so that it may be conveniently handled. At the other side the body is provided with a second stem 20 so that it may be mounted upon its side upon the bracket. The stem 20 is identical as to size and shape with the stem 17. Each of the stems is provided with a transverse opening 21 adapted to align with similar openings 22 formed in the bracket 10 so that a pin 23 may be engaged through these openings and serve to absolutely hold the body down upon the bracket. The pin 23 may be removed so as to allow the body to be turned to any position desired as allowed by the different sides of the stems and the opening in the bracket. The dot and dash lines in Fig. 2 indicate a turned position of the body member.

As illustrated on the drawing the stems 17 and 20 have four equal sides. Thus it is possible to locate the body in four different positions upon the bracket. If there were five sides then the body could be placed in five different positions.

In Figs. 4 and 5 a modification of the invention has been disclosed in which provision is made for angularly adjusting the body relative to the stem within angular distances between any two of the sides of the stem. Thus if the stem has four sides then the adjustment will be through 90 degrees.

In detail, the stem 17 is separate from the body and rotatively connected therewith by reason of being formed with a neck portion 24 connected with a head portion 25 rotatively mounted in corresponding openings in the bottom of the body. The neck portion 24 is shown welded on to the head portion 25. The head portion 25 is shown within a corresponding recess in the body which construction is possible by reason of the lower portion of the body being welded to the remaining portion of the body along the line 26. A finger 27 projects from the head portion 25 and engages through a slot 28 formed in the body so as to limit possible rotation through the angular position desired. A plate 29 is detachably mounted upon the side of the body and is formed at the bottom with a plurality of teeth or serrations 30 engaging immediately over the slot 28. The front end of the pin 27 is of a shape so as to be adapted to engage between the teeth of the serrations 30. Thus the teeth hold the stem 17 in a fixed position. If the plate 29 is removed then the stem 17 may be adjusted relative to the body. Thereafter the plate 29 should be replaced.

In the construction illustrated in Figs. 4 and 5 it is possible that the body be arranged at a great number of different inclined positions upon the bracket. The sides of the stem 17 allow angular adjustment through large angles depending upon the number of sides while the specific adjustment between the stem and the body allow for adjustment between the large angles. Thus various angular positions may be obtained for the body upon the bracket.

In Figs. 6 and 7 another modified construction of the invention has been disclosed in which provision is made for the universal pulley block to support stumps or other members below the body of a truck. More particularly this pulley block comprises a bracket 31 adapted to be mounted upon the rear of the body of a truck and formed with a vertical portion 32 for engaging against the rear edge of the truck body. This body 31 is provided with an opening 33 adapted to receive the stem 34 from the body 35 of the pulley block. The stem 34 and the opening 33 have sides of equal length and determine the number of different positions which the body may be placed in relation to the bracket. The body 10 is substantially of fork shape with the arms directed upwards and with the stem located at the bottom. A pulley 35' is rotatively mounted between the arms of the body 35. The arrangement is such that a cable 36 may be extended over the pulley and passed down to below the body of the truck and support a beam 32' or the like. It is necessary that the pulley 35' extend sufficiently to the rear so that the cable 36 does not rub against the part of the pulley block.

While I have shown and described the preferred embodiment of my invention, it is to be understood that I do not limit myself to the precise construction herein disclosed and the right is reserved to all changes and modifications coming within the scope of the invention as defined in the appended claims.

Having thus described my invention, what I claim as new, and desire to secure by United States Letters Patent is:—

1. A universal pulley block, comprising a bracket adapted to be attached upon the rear of a truck or the like and having a vertical opening, a body of substantially fork shape having a bottom stem for engaging in said opening, cooperating elements on said stem and within said opening for holding the stem in various rotative positions, the arms of the fork being disposed at an inclination to the vertical, a roller rotatively mounted between said arms, and another stem projecting from the side of said body, and cooperating elements on said latter stem for engaging within said opening for holding the stem in various rotative positions so that the body may assume various positions but upon its side.

2. A universal pulley block, comprising a bracket adapted to be attached upon the rear of a truck or the like and having a vertical opening having a plurality of straight sides of equal length, a body of substantially fork shape having a bottom stem for engaging in said aperture, said stem having the same number of sides as the aperture, the arms of the fork being disposed at an inclination to the vertical, a roller rotatively mounted between said arms, and another stem similar to said stem but projecting from the side of said body so that said body may assume various positions on said aperture but upon its side.

3. A universal pulley block, comprising a bracket adapted to be attached upon the rear of a truck or the like and having a vertical opening having a plurality of straight sides of equal length, a body of substantially fork shape having a bottom stem for engaging in said aperture, said stem having the same number of sides as the aperture, the arms of the fork being disposed at an inclination to the vertical, and a roller rotatively mounted between said arms, said stem being rotatively mounted, and means for adjusting said body and stem to various positions through an angle substantially numerically equal to the angle between the sides of said stem, comprising a finger connected with said stem and projecting through a slot in said body, and a detachable plate mounted upon said body and formed with serrations along one edge adapted to engage with said finger and hold said finger in desirous positions between said teeth.

EVERETT M. BUSH.